US009288852B2

(12) United States Patent
Chen et al.

(10) Patent No.: US 9,288,852 B2
(45) Date of Patent: Mar. 15, 2016

(54) DRIVING CIRCUITS FOR LIGHT EMITTING ELEMENTS

(75) Inventors: Sean S. Chen, Sunnyvale, CA (US); Wenbo Liang, San Jose, CA (US)

(73) Assignee: Atmel Corporation, San Jose, CA (US)

( * ) Notice: Subject to any disclaimer, the term of this patent is extended or adjusted under 35 U.S.C. 154(b) by 173 days.

(21) Appl. No.: 13/413,820

(22) Filed: Mar. 7, 2012

(65) Prior Publication Data

US 2013/0093339 A1 Apr. 18, 2013

Related U.S. Application Data

(63) Continuation of application No. 13/275,954, filed on Oct. 18, 2011.

(51) Int. Cl.
  *H05B 37/02* (2006.01)
  *H05B 33/08* (2006.01)

(52) U.S. Cl.
  CPC ........ *H05B 33/0812* (2013.01); *H05B 33/0827* (2013.01); *Y02B 20/343* (2013.01); *Y02B 20/345* (2013.01)

(58) Field of Classification Search
  CPC .......................... H05B 33/083; H05B 33/0863
  USPC ...................................... 315/185 R
  See application file for complete search history.

(56) References Cited

U.S. PATENT DOCUMENTS

| | | | |
|---|---|---|---|
| 4,182,977 A | 1/1980 | Stricklin, Jr. | |
| 6,621,235 B2 | 9/2003 | Chang | |
| 6,897,618 B2* | 5/2005 | Fukuzako | 315/169.1 |
| 6,959,083 B2* | 10/2005 | Scott et al. | 379/412 |
| 7,145,929 B2 | 12/2006 | Bergmann et al. | |
| 7,184,311 B2* | 2/2007 | Frulio et al. | 365/185.18 |
| 7,609,098 B2 | 10/2009 | Bergmann | |
| 7,855,515 B2 | 12/2010 | Huang et al. | |
| 7,911,151 B2 | 3/2011 | Xu | |
| 7,978,743 B2 | 7/2011 | Deppe et al. | |
| 8,004,211 B2 | 8/2011 | Van Erp | |
| 2002/0079876 A1* | 6/2002 | Eguchi | 323/313 |
| 2005/0168419 A1* | 8/2005 | Shimizu | 345/82 |
| 2006/0139237 A1 | 6/2006 | Knotz et al. | |
| 2007/0115227 A1 | 5/2007 | Nishida et al. | |
| 2008/0068298 A1 | 3/2008 | Shen et al. | |

(Continued)

OTHER PUBLICATIONS

Design and Application Guide for High Speed MOSFET Gate Drive Circuits, Laszlo Balogh, Texas Instruments, 2002.*

(Continued)

*Primary Examiner* — Alexander H Taningco
*Assistant Examiner* — Christine Johnson
(74) *Attorney, Agent, or Firm* — Fish & Richardson P.C.

(57) ABSTRACT

A circuit for driving light emitting elements, such as LEDs, includes a first transistor having a source coupled to ground through a first resistive element, and a second transistor having a gate electrically coupled to a gate of the first transistor, a source electrically coupled to ground, and a drain for electrical connection to a first group of light emitting elements. The circuit also includes circuitry to provide a predetermined voltage at the source of the first transistor, circuitry to compensate for a difference in respective gate-source voltages of the first and second transistors, and circuitry to compensate for a difference in respective drain-source voltages of the first and second transistors. In some implementations, the circuit can achieve relatively low power consumption.

18 Claims, 6 Drawing Sheets

(56) References Cited

U.S. PATENT DOCUMENTS

| | | |
|---|---|---|
| 2008/0258636 A1 | 10/2008 | Shih et al. |
| 2009/0289559 A1* | 11/2009 | Tanaka et al. ............. 315/185 R |
| 2009/0322235 A1* | 12/2009 | Shiu et al. ................. 315/185 R |
| 2010/0013395 A1* | 1/2010 | Archibald et al. ........ 315/185 R |
| 2010/0134018 A1* | 6/2010 | Tziony et al. ................. 315/122 |
| 2010/0244947 A1* | 9/2010 | Massie et al. ................. 327/581 |
| 2012/0200229 A1 | 8/2012 | Kunst et al. |
| 2013/0093338 A1 | 4/2013 | Chen et al. |

OTHER PUBLICATIONS

Design and Application Guide for High Speed MOSFET Gate Drvice Circuits, Lazlo Balogh, Texas Instruments, 2002.*

USPTO, Office action issued in U.S. Appl. No. 13/275,954 dated Oct. 2, 2013, 33 pages.

Non-final office action issued in U.S. Appl. No. 13/275,954 dated Jan. 5, 2015, 18 pages.

Final office action issued in U.S. Appl. No. 13/275,954 dated Aug. 10, 2015, 19 pages.

Atmel Corporation, "Atmel LED Drivers MSL 1061/MSL 1064," Datasheet Brief, 20 pages (Jun. 2011).

Atmel Corporation, "Atmel LED Driver—MLS 1060," Datasheet, 20 pages (Jun. 2011).

Texas Instruments Incorporated, "LED-driver considerations," *Analog Applications Journal*, www.ti.com/sc/analogapps, pp. 14-18 (2004).

Final office action issued in U.S. Appl. No. 13/275,954 dated Apr. 22, 2014, 25 pages.

* cited by examiner

DRIVING CIRCUITS FOR LIGHT EMITTING ELEMENTS

CROSS-REFERENCE TO RELATED APPLICATIONS

This application is a continuation of U.S. patent application Ser. No. 13/275,954, filed Oct. 18, 2011, which is incorporated herein in its entirety.

BACKGROUND

This disclosure relates to circuits for driving light emitting elements such as light emitting diodes (LEDs).

LEDs are current-driven devices whose brightness is proportional to their forward current. Forward current can be controlled in various ways. For example, one technique is to use the LED current-voltage (I-V) curve to determine what voltage needs to be applied to the LED to generate a desired forward current. Another technique, of regulating LED current is to drive the LED with a constant-current source. The constant-current source can help eliminate changes in current due to variations in forward voltage, which results in constant LED brightness. In this technique, rather than regulating the output voltage, the input power supply regulates the voltage across a current-sense resistor. The power supply reference voltage and the value of die current-sense resistor determine the LED current.

One issue that arises in some LED driver circuits is high power consumption.

SUMMARY

The subject matter described in this disclosure relates to LED driver circuits, which in some implementations, can help reduce power consumption.

For example, in one aspect, a circuit for driving light emitting elements includes a first transistor having a source coupled to ground through a first resistive element, and a second transistor having a gate electrically coupled to a gate of the first transistor, a source electrically coupled to ground, and a drain for electrical connection to a first group of light emitting elements. The circuit also includes circuitry to provide a predetermined voltage at the source of the first transistor, circuitry to compensate for a difference in respective gate-source voltages of the first and second transistors, and circuitry to compensate for a difference in respective drain-source voltages of the first and second transistors.

In a second aspect, a circuit for driving a string of light emitting diodes includes a first transistor having a gate, a source coupled to ground through a first resistive element, and a drain. Circuitry is included to provide a voltage having a predetermined value to the source of the first transistor. A second transistor has a gate, a source electrically coupled to ground, and a drain for electrical connection to the string of light emitting diodes. A second resistive element has a first end coupled electrically to a gate of the first transistor and a second end coupled electrically to the gate of the second transistor. A first current source is coupled electrically between the second end of the second resistive element and ground. A third resistive element has one end coupled electrically to the drain of the first transistor and a second end coupled electrically to the drain of the. second transistor.

Various apparatus that can include the driving circuits, as well as methods of operation, are described below.

Some implementations include one or more of the following advantages. For example, as noted above, in some implementations, the circuits can achieve relatively low power consumption. The second transistor generates a relatively controlled and stable drive current that, in some implementations, varies little, if at all, with changes in the voltage of the LED string.

Other aspects, features and advantages will be readily apparent from the following detailed description, the accompanying drawings, and the claims.

DETAILED DESCRIPTION

Figure 1:
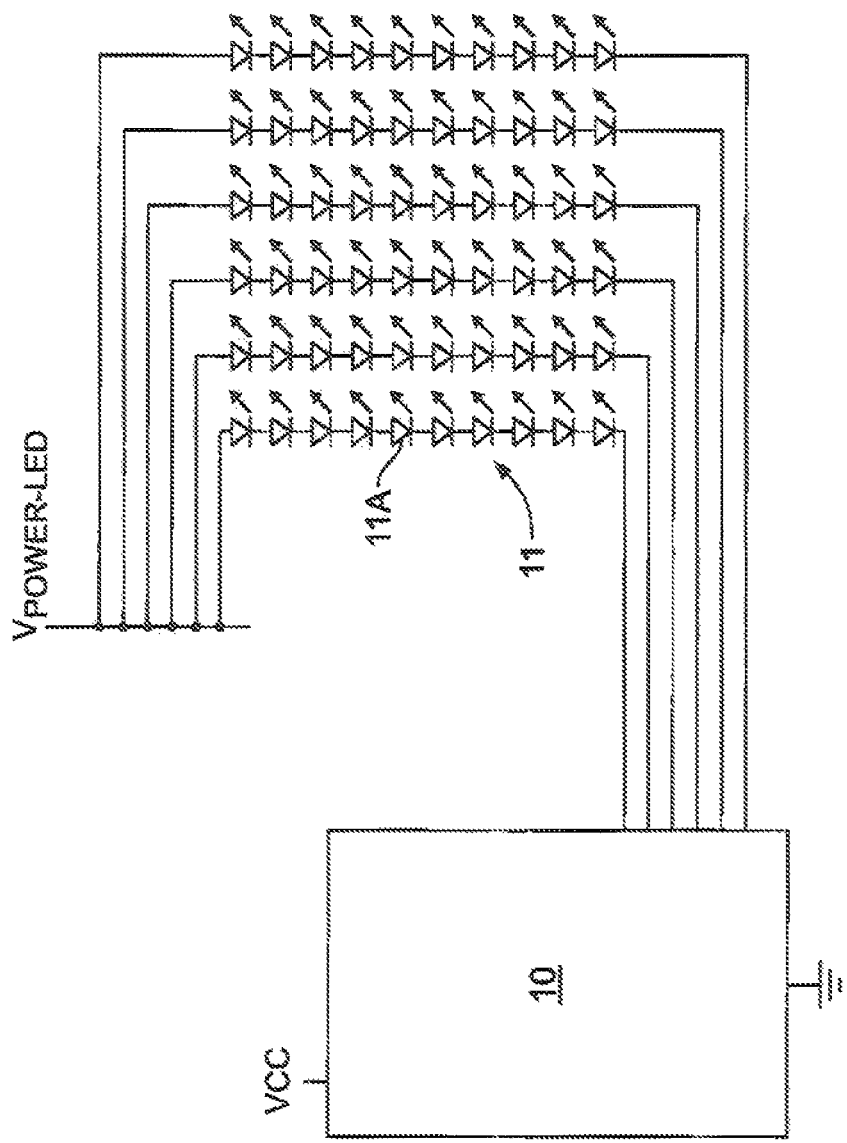
FIG. 1 is a simplified diagram illustrating driving of multiple LED strings.

As illustrated in FIG. 1, outputs from a LED driver circuit 10 are coupled, respectively, to LED strings 11. In the example of FIG. 1, there are six LED strings 11 connected in parallel, each of which includes ten LEDs 11A connected in series. In some implementations, however, the driver circuit 10 may drive a different number of LED strings (e.g., eight or sixteen) and, in some cases, may drive only a single LED string. Furthermore, in some implementations, the number of LEDs in each string 11 may differ from ten.

The number of LED strings, as well as the number of LEDs in each string, may depend on the particular type of device and application. For example, the LED driver technology described here can be used, for example, in backlighting and solid-state lighting applications. Examples of such applications include LCD TVs, PC monitors, specialty panels (e.g., in industrial, military, medical, or avionics applications) and general illumination for commercial, residential, industrial and government applications. The LED driver technology described here can be used in other applications as well, including backlighting for various handheld devices. The driver circuit 10 can be implemented as an integrated circuit fabricated, for example, on a silicon or other semiconductor substrate.

As illustrated in FIG. 1, the driver circuit 10 includes connections to a power supply voltage (VCC) and to ground. The LED strings 11 are coupled to a LED power supply voltage $V_{POWER-LED}$.

Figure 2:
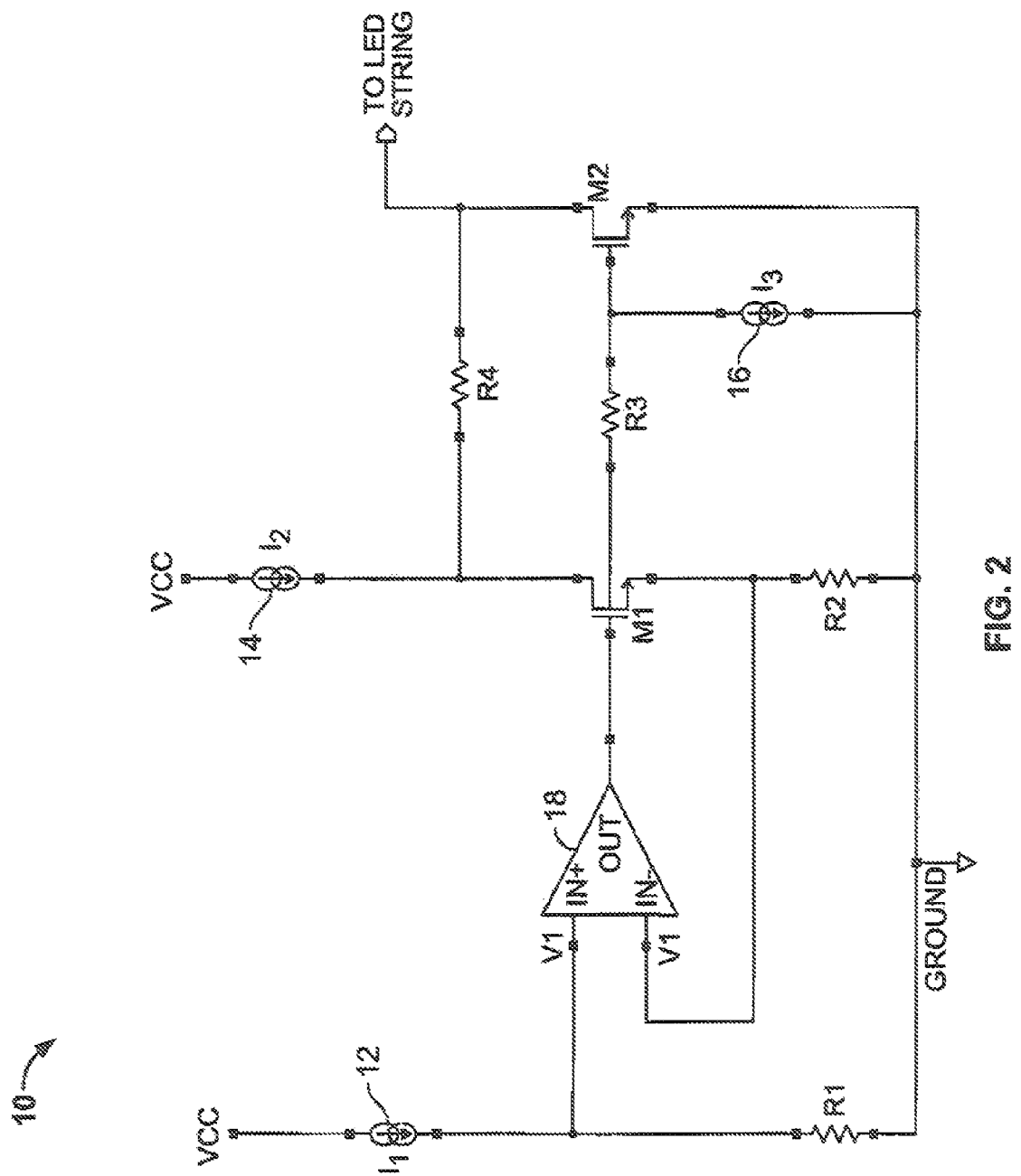
FIG. 2 illustrate details of an example circuit for driving a single LED string.

As illustrated in the example of FIG. 2, the driver circuit 10 includes several current sources 12, 14, 16, an operational amplifier 18, resistors R1, R2, R3, R4, and transistors M1, M2. The reference current source 12 generates a current that flows through resistor R1. This current flow generates a reference voltage V1 at the non-inverting input (in+) of the operational amplifier 18. Substantially the same voltage (V1) appears at the inverting input (in−) of the operational amplifier 18, and this voltage appears across the resistor R2, which is coupled between the source of the transistor M1 and ground. Thus, the Operational amplifier 18 regulates the voltage appearing at the source of transistor M1 by maintaining the voltage at the inverting input (in−) at the same level as the voltage appearing at the non-inverting input (in+).

As further shown in FIG. 2, the output of the operational amplifier 18 is coupled to the gate of transistor M1 and (through resistor R3) to the gate of transistor M2. The transistors M1, M2 can be implemented, for example, as MOS transistors. In the illustrated example, the size (i.e., area) of transistor M2, which provides the current for an LED string coupled to the drain of transistor M2, is X times larger than the size of transistor M1. The value of X can vary over a wide range depending on the particular circuit design. In some implementations, the, ratio of the of the transistors M1:M2 is on the order of about 1:1000. The relative sizes of the transistors M1, M2 can be used to generate a larger current for the LED string. For example; if the gate-source voltage's (Vgs) of the transistors M1, M2 were substantially the same, then transistor M2 would provide a controllable, substantially stable current that is about X times as large as the current through transistor M1. However, in actual implementations, the gate-source voltages on the transistors differ from one another due to the fact that the source of the transistor. M2 is connected directly to ground, whereas the source of the transistor M1 is connected to ground through resistor R2. Without additional circuit components such as those described below (e.g., resistors R3, R4 and current source 16), the current generated by transistor M2 will typically depend on the voltage of the LED string because of the difference in the gate-source voltages. Thus, in the absence of the additional circuit components (e.g., resistors R3, R4 and current source 16), the current generated by transistor M2 for the LED string will vary and, thus, is not well-controlled or stable.

To help ensure that the current generated by second transistor M2 remains at the desired level, additional circuit components (e.g., resistors R3, R4 and current source 16) are provided to compensate for differences in the gate-source voltages of the transistors M1, M2 and to compensate for differences in their drain-source voltages.

To compensate for the difference in the gate-source voltages of the transistors M1, M2, resistor R3 is coupled between the gates of the transistors M1, M2. In addition, a current source 16 is coupled between the gate of transistor M2 and ground. The values of the resistor R3 and the current source 16 should be selected such that the voltage V1 across resistor R2 is substantially equal to the value of the resistor R3 multiplied by the current $I_3$ generated by the current source 16 (i.e., $V1=I_3 \times R3$). The voltage generated by the current $I_3$ (from source 16) flowing through resistor R3 compensates for the difference in gate-source voltages of the transistors M1, M2. Furthermore, to compensate for the difference in drain-source voltages (Vds) of the transistors M1, M2, resistor R4 is coupled between the respective drains of the transistors.

Figure 3:
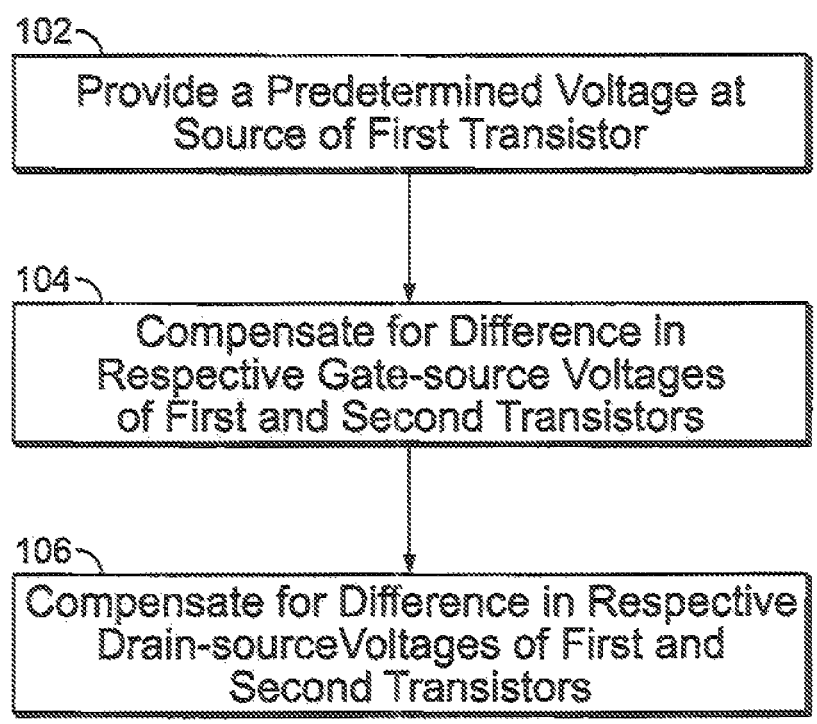
FIG. 3 is a flow chart of a method of operation of the driving circuit.

As indicated by FIG. 3, in operation, the circuit 10 provides a predetermined voltage at the source of the first transistor M1, (102), compensates for a difference in respective gate-source voltages of the first and second transistors M1, M2 (104), and compensates for a difference in respective drain-source voltages of the first and second transistors M1, M2 (106).

As an illustrative example, it is assumed that the values of resistors R2, R3 and R4 are the same. In that case, half the current from the current source 14 flows through transistor M1 and resistor R2, and the same amount of current flows through resistor R4. Thus, in this example, a current $I_2/2$ flows through transistor M1 (and resistor R2). Likewise, when the voltage of the LED string is lower than the power supply voltage (VCC), a current $I_2/2$ also flows through resistor, R4 to compensate for the difference in drain-source voltages between the transistors M1 and M2.

Continuing with the foregoing example, the voltage V1 at the source of the transistor M1 is equal to the product of the resistance R2 and the current flowing through that resistor (i.e., $V1=I_2/2 \times R2$). The voltage V1 also is equal to the product of the current from current source 12 and the resistance R1 (i.e., $V1=I_1 \times R1$). Values of the current sources 12, 14 and the resistors R1, R2 can be selected using the foregoing information.

As explained above, the values of the resistor R3 and the third current source 16 are selected such that $V1=I_3 \times R3$. Using the foregoing example in which R3=R2, the value of the current source would be set equal to $I_2/2$ so as to compensate for the difference in gate-source voltages of the transistors M1 and M2.

In some implementations, the values of the resistors and current sources may differ from the foregoing example.

By using the driver circuit 10 of FIG. 2, the current generated by transistor M2 can be substantially independent of the voltage of the LED string. The circuit 10 can, therefore, provide a more controllable drive current.

The extent of power savings that can be achieved in some implementations can be appreciated by considering a driver circuit without transistor current sources 14, 16 and resistors R3, R4, but with the drain of transistor M1 coupled to the LED string. If V1 were 250 mV and the current required of transistor M1 were 60 mA, the power consumption would be on the order of 0.015 Watts. If there are eight LED strings in the device, power consumption would be on the order of 0.12 Watts. The requirement of a voltage and current on resistor R2 results in significant waste or loss of power. In contrast, the driver circuit 10 of FIG. 2 can achieve a significant, reduction in power consumption, for example, on the order of 99% in some implementations.

Furthermore, the drive circuit 10 of. FIG. 2 can result in a significant reduction in the amount of die area. For a driver circuit without transistor M2, current sources 14, 16 and resistors R3, R4, but with the drain of transistor M1 Coupled to the LED string, the ratio of R1:R2 may need to be on the order of 1,000 for some implementations, which cane require a large die area for resistor R2. In contrast, the driver circuit of FIG. 2 does not require such a high ratio of resistor values and, therefore, can significantly reduce the amount of die area required (e.g., by as much as about 20% for some implementations).

Figure 4:
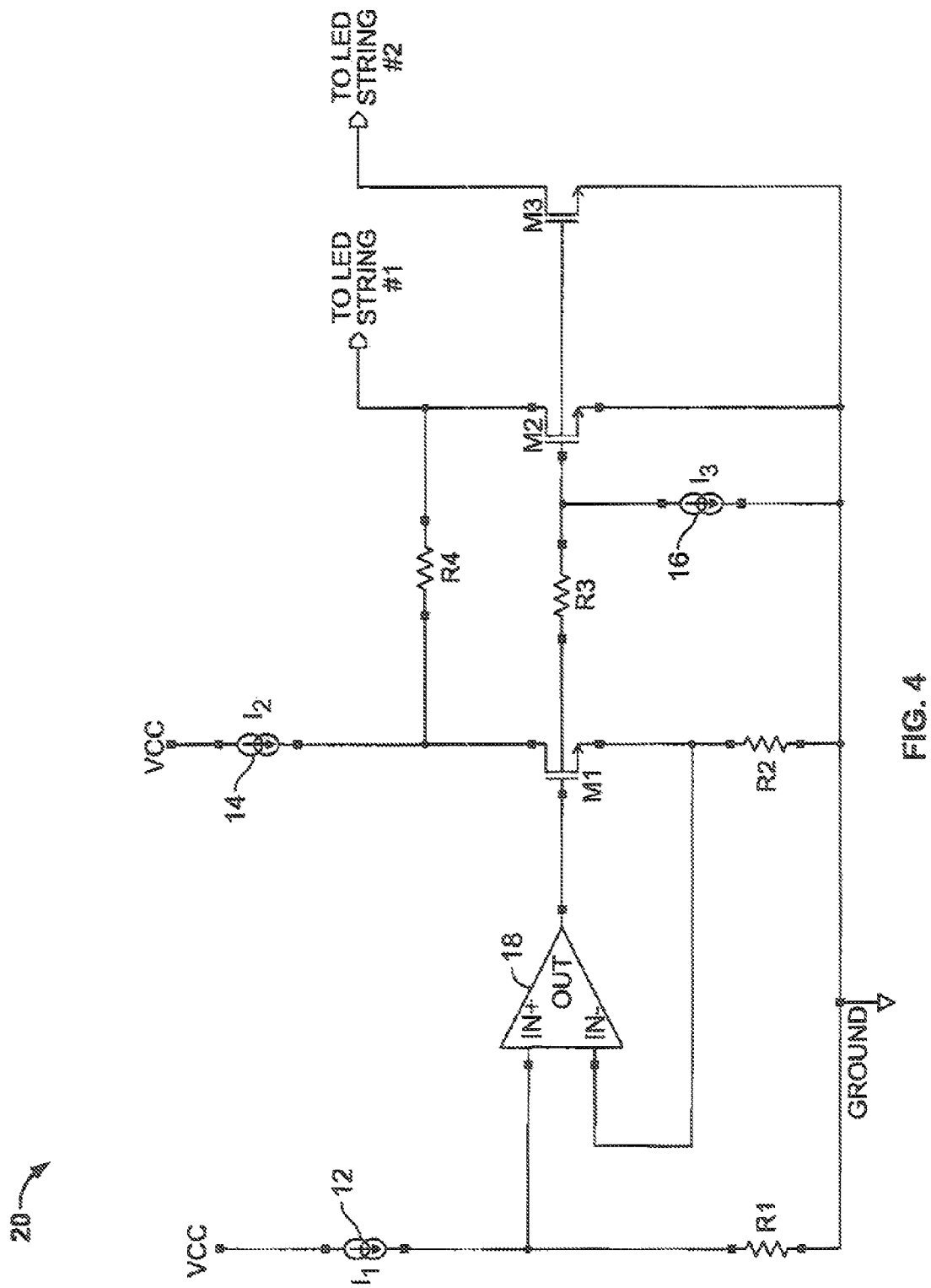
FIG. 4 illustrates details of an example circuit for driving multiple LED strings.
Figure 5:
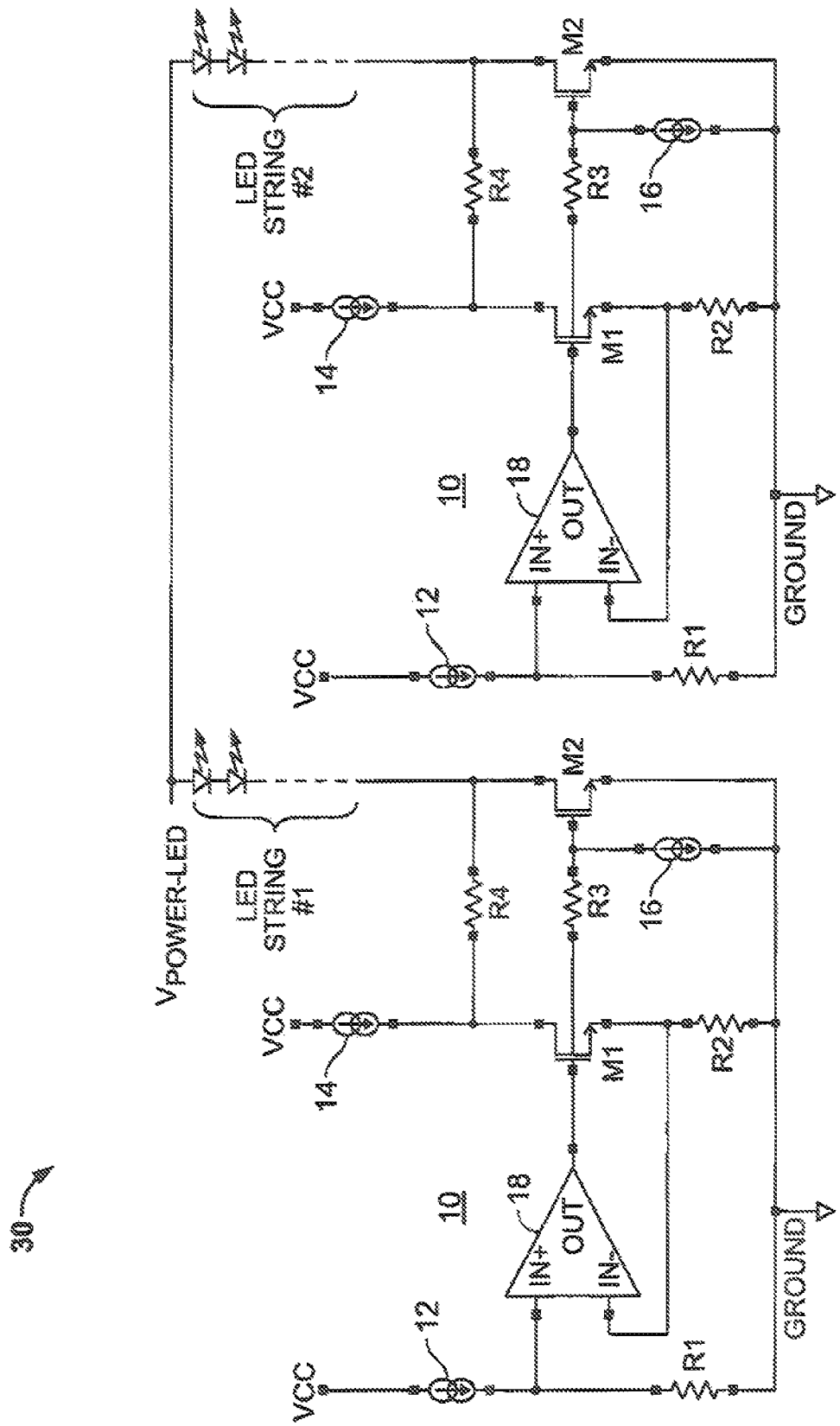
FIG. 5 illustrates another example of a circuit for driving multiple LED strings.

FIGS. 4 and 5 illustrate examples of circuits for driving multiple LED strings. If PWM control of the respective LED strings is to be substantially the same (e.g., same-phase and frequency), the circuit 20 of FIG. 4 can be used. Circuit 20 is similar to circuit 10 of FIG. 2 except that an additional transistor M3 is provided to generate the current for the second LED string. As illustrated in the example of FIG. 4, the gate of transistor M3 is coupled to the gate of transistor M2, which is coupled to the gate of transistor M1 through resistor R3 as described above. The drain of transistor M2 is coupled to the first LED string, whereas the drain of transistor M3 is coupled to the second LED string. The source of transistor M3, like the source of transistor M2 is coupled directly to ground. In this example, the size of transistor M3 can be substantially the same as the size of transistor M2.

On the other hand, if PWM control of the respective LED strings is to differ from one another, then the circuit 30 of FIG. 5 can be used. Different LED strings may require different currents, for example, if the strings contain, different types of LEDs (e.g., the first string contains LEDs that emit light of a first color, and the second string contains LEDs that emit light of a second color, different from the first color). The circuit 30 of FIG. 5 includes multiple copies (in this case two) of the circuit 10 of FIG. 2. Each circuit 10 is coupled to one of the LED strings.

Although FIGS. 4 and 5 illustrate only two LED strings, some implementations may include a greater number of LED strings. In that case, additional circuitry can be added as needed. For example, in FIG. 4, additional transistors similar to M2 and M3 can be provided to generate the current needed to drive the additional LED strings. Likewise, in FIG. 5, additional copies of the circuit 10 can be provided to generate the current needed to drive the additional LED strings.

Figure 6:
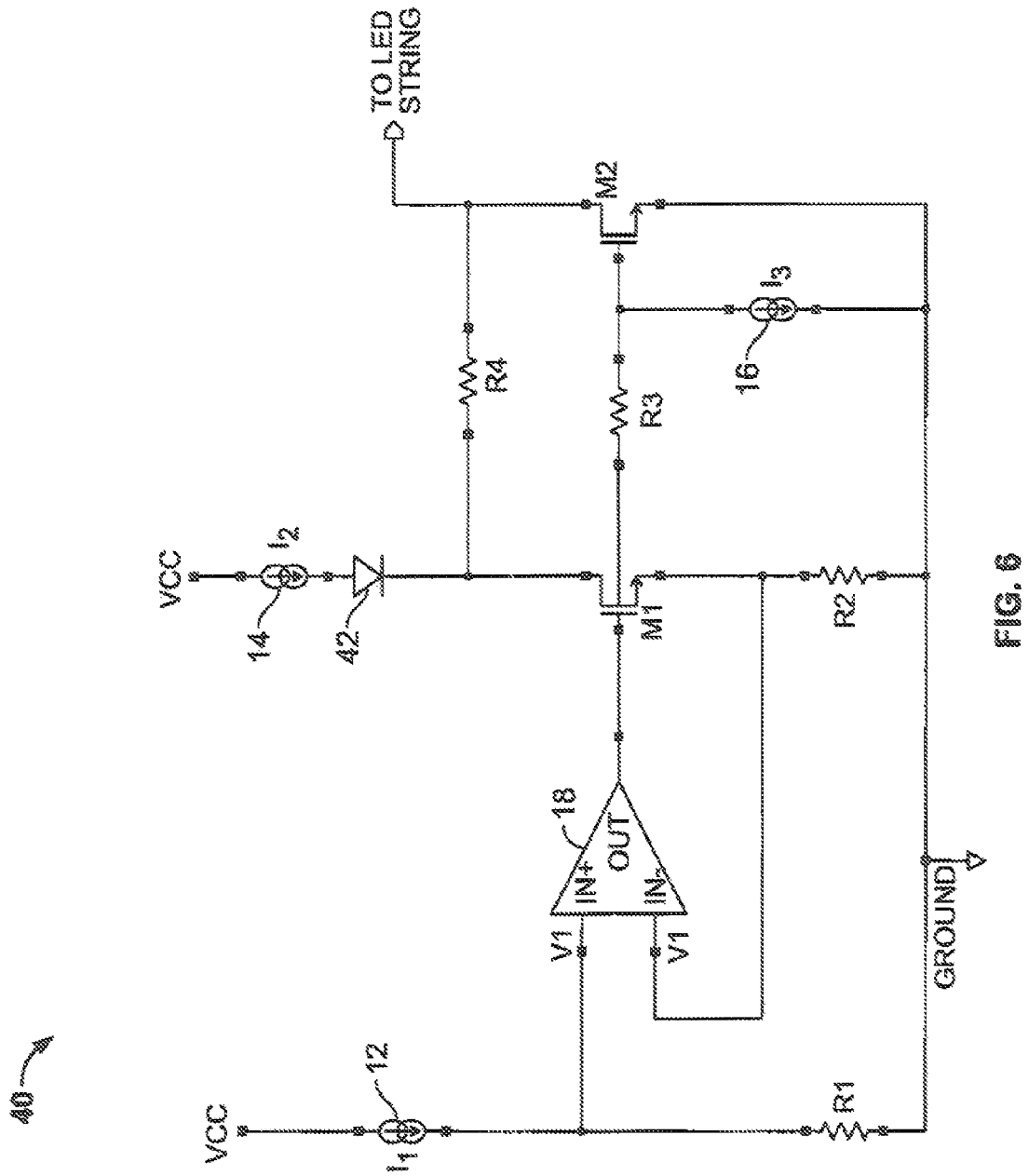
FIG. 6 illustrates an example of a LED driver circuit with protection circuitry.

FIG. 6 illustrates a drive circuit 40 that is similar to the circuit of FIG. 2, but which also includes protection diode 42 or other circuit components to protect the current source 14 in the event that the voltage of the LED string becomes greater than the power supply voltage VCC. Instead of the diode 42, other circuit components can be used, such as a clamp. Furthermore, the protection circuitry can be separate from the current source 14 or can be part of the current source 14.

Each, resistive element R1, R2, R3, R4 can be implemented, respectively, for example, as a single resistive component or as a combination of resistive components connected in series and/or in parallel.

Other implementations are within the scope of the claims

What is claimed is:

1. A circuit for driving a string of light emitting diodes, the circuit comprising:
   a first MOS transistor;
   a second MOS transistor including a drain for electrical coupling to a first string of light emitting diodes and including a source coupled to ground;
   a first resistive element electrically coupling a source of the first MOS transistor to ground;
   circuitry, comprising an operational amplifier, operable to regulate a voltage across the first resistive element, the operational amplifier including an inverting input electrically coupled to the source of the first MOS transistor, and an output electrically coupled to the gate of the first MOS transistor;
   a second resistive element having a first end electrically coupled to a gate of the first MOS transistor and having a second end electrically coupled to a gate of the second MOS transistor;
   a first current source electrically coupled between the gate of the second MOS transistor and ground;
   a second current source electrically coupled between a drain of the first MOS transistor and a power supply voltage; and
   a third resistive element electrically coupled between the drain of the first MOS transistor and a drain of the second MOS transistor.

2. The circuit of claim 1 wherein the operational amplifier has a non-inverting input electrically coupled to a predetermined voltage, and has an inverting input electrically coupled to a node between the source of the first MOS transistor and the first resistive element.

3. The circuit of claim 2 wherein the circuitry to regulate the voltage across the first resistive element further includes:
   a third current source; and
   a fourth resistive element electrically coupled between the third current source and ground; and
   wherein the non-inverting input of the operational amplifier is electrically coupled to a node between the third current source and the fourth resistive element, and wherein the inverting input of the operational amplifier is electrically coupled to the node between the source of the first MOS transistor and the first resistive element.

4. The circuit of claim 1 further comprising a third MOS transistor including a drain for electrical coupling to a second string of light emitting diodes, a gate electrically coupled to the gate of the second MOS transistor, and a source electrically coupled to ground.

5. The circuit of claim 1 further comprising circuitry, including a diode, arranged to protect the second current source when a voltage across the string of light emitting diodes is greater than the power supply voltage.

6. The circuit of claim 5 wherein the diode is coupled between the second current source and the drain of the first MOS transistor.

7. An apparatus comprising:
   a first group of light emitting diodes in series; and
   a circuit for driving the first group of light emitting diodes, wherein the circuit includes:
   a first MOS transistor;
   a first resistive element electrically coupling a source of the first MOS transistor to ground;
   a second MOS transistor including a drain electrically coupled to the first group of light emitting diodes and including a source coupled to ground;
   voltage regulating circuitry, comprising an operational amplifier, the voltage regulating circuitry arranged to regulate a voltage across the first resistive element;
   a second resistive element electrically coupled between a gate of the first MOS transistor and a gate of the second MOS transistor;
   a first current source electrically coupled between the gate of the second MOS transistor and ground;
   a second current source electrically coupled between a drain of the first MOS transistor and a power supply voltage; and
   a third resistive element electrically coupled between the drain of the first MOS transistor and a drain of the second MOS transistor.

8. The apparatus of claim 7 wherein a current generated by the second MOS transistor is substantially independent of a voltage across the first group of light emitting diodes.

9. The apparatus of claim 7 further comprising:
   a second group of light emitting diodes in series; and
   a third MOS transistor including a drain electrically coupled to the second group of light emitting diodes, a gate electrically coupled to the gate of the second MOS transistor, and a source electrically coupled to ground.

10. The apparatus of claim 7 further comprising:
   a plurality of additional groups of light emitting diodes;
   a plurality of additional MOS transistors each of which includes a drain electrically coupled to a respective one of the additional groups of light emitting diodes, a gate electrically coupled to the gate of the second MOS transistor, and a source electrically coupled to ground.

11. The apparatus of claim 7 wherein the operational amplifier has a non-inverting input electrically coupled to a predetermined voltage, and has an inverting input electrically coupled to a node between the source of the first MOS transistor and the first resistive element.

12. The apparatus of claim 7 further comprising circuitry, including a diode, arranged to protect the second current source when a voltage across the first group of light emitting diodes is greater than the power supply voltage.

13. The apparatus of claim 11 wherein the diode is coupled between the second current source and the drain of the first MOS transistor.

14. A circuit for driving a group of light emitting elements in series, the circuit comprising:
   a first transistor;

a first resistive element electrically coupling a source of the first transistor to ground;

a second transistor including a drain arranged to provide an output for driving the group of light emitting elements and including a source coupled to ground;

circuitry, comprising an operational amplifier, operable to regulate a voltage across the first resistive element, wherein the operational amplifier includes an inverting input electrically coupled to the source of the first transistor, and an output electrically coupled to the gate of the first transistor;

a second resistive element electrically coupled between a gate of the first transistor and a gate of the second transistor;

a first current source electrically coupled between the gate of the second transistor and ground a second current source electrically coupled between a drain of the first transistor and a power supply voltage; and a third resistive element electrically coupled between the drain of the first transistor and a drain of the second transistor.

15. The circuit of claim 14 wherein a current generated by the second transistor is substantially independent of a voltage across the group of light emitting elements.

16. The circuit of claim 1 wherein the source of the second MOS transistor is connected directly to ground.

17. The circuit of claim 1 operable such that a voltage across the first resistive element is substantially equal to a product of current generated by the first current source and a value of the second resistive element, and wherein, collectively, the second and third resistive elements and the first current source are operable such that voltage generated by current flowing through the first resistive element compensates for a difference in gate-source voltages of the first and second MOS transistors, and are operable to compensate for a difference in drain-source voltages of the first and second MOS transistors.

18. The circuit of claim 7 operable such that, during operation of the circuit, a voltage across the first resistive element is substantially equal to a product of current generated by the first current source and a value of the second resistive element.

* * * * *

UNITED STATES PATENT AND TRADEMARK OFFICE
CERTIFICATE OF CORRECTION

| | | |
|---|---|---|
| PATENT NO. | : 9,288,852 B2 | Page 1 of 1 |
| APPLICATION NO. | : 13/413820 | |
| DATED | : March 15, 2016 | |
| INVENTOR(S) | : Sean S. Chen and Wenbo Liang | |

It is certified that error appears in the above-identified patent and that said Letters Patent is hereby corrected as shown below:

Title Page 2, Column 1, Line 1 (List of references cited by examiner); Delete "Drvice" and insert -- Drive --, therefor.

Specification

Column 1, Line 27; Delete "die" and insert -- the --, therefor.

Column 1, Line 63; Delete "the." and insert -- the --, therefor.

Column 2, Line 53; Delete "$V_{POWER\text{-}LED}$." and insert -- ($V_{POWER\text{-}LED}$). --, therefor.

Column 3, Line 10; Delete "the, ratio of the of the" and insert -- the ratio of the sizes --, therefor.

Column 3, Line 13; Delete "voltage's" and insert -- voltages --, therefor.

Column 3, Line 20; Delete "transistor." and insert -- transistor --, therefor.

Column 4, Line 48; Delete "same-phase" and insert -- same phase --, therefor.

Column 5, Line 20; Delete "Each," and insert -- Each --, therefor.

Column 5, Line 24; After "claims" insert -- . --.

Claims

Column 7, Line 16; In Claim 14, after "ground" insert -- ; --.

Signed and Sealed this
Thirty-first Day of May, 2016

Michelle K. Lee
*Director of the United States Patent and Trademark Office*